United States Patent [19]

Pelletier

[11] 4,117,954
[45] Oct. 3, 1978

[54] METERING DEVICE FOR BULK MATERIALS, MORE PARTICULARLY CONSTITUENTS OF ANIMAL FOODSTUFFS

[75] Inventor: René Charles Pelletier, Senlis, France

[73] Assignee: Secemia, France

[21] Appl. No.: 683,306

[22] Filed: May 5, 1976

Related U.S. Application Data

[63] Continuation of Ser. No. 508,532, Sep. 23, 1974, abandoned.

[30] Foreign Application Priority Data

Oct. 1, 1973 [FR] France ................................ 73 34992

[51] Int. Cl.² ........................................... B65G 33/14
[52] U.S. Cl. .................................... 222/134; 222/142; 222/145
[58] Field of Search ............... 222/142, 134, 138, 145, 222/59; 198/78–80; 74/600; 302/50; 64/28 R

[56] References Cited

U.S. PATENT DOCUMENTS

| 827,664 | 7/1906 | Pumphrey | 198/79 X |
|---|---|---|---|
| 2,596,898 | 5/1952 | Hoppes | 222/142 |
| 3,176,878 | 4/1965 | Hobgood et al. | 222/142 X |
| 3,254,798 | 6/1966 | Buschbom | 222/59 |
| 3,301,006 | 1/1967 | Sharp | 64/28 R X |
| 3,602,552 | 8/1971 | Morgan | 302/50 |

FOREIGN PATENT DOCUMENTS

2,067,849 8/1971 France.

Primary Examiner—Robert B. Reeves
Assistant Examiner—John P. Shannon

[57] ABSTRACT

A plurality of metering conveyors for individual constituents of a mixture is arranged in conjunction with a single discharge conveyor. A drive means comprising a motor and transmission means simultaneously drive the discharge conveyor and is successively connected to each of the metering conveyors. A speed variator is interposed between each metering conveyor and the transmission means for individual control of each of the metering conveyors during operation.

10 Claims, 5 Drawing Figures

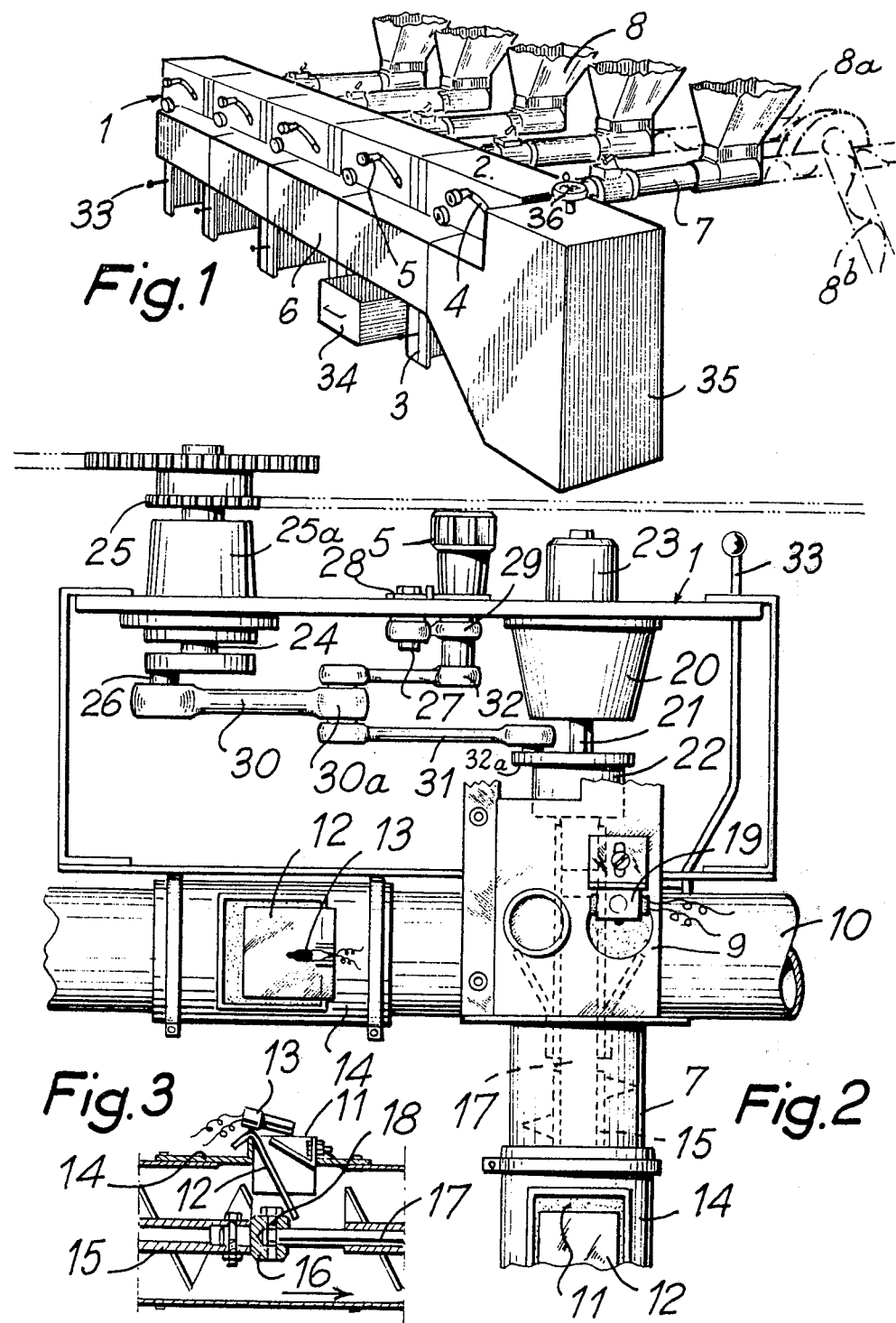

METERING DEVICE FOR BULK MATERIALS, MORE PARTICULARLY CONSTITUENTS OF ANIMAL FOODSTUFFS

This is a continuation application of Ser. No. 508,532 filed Sept. 23, 1974, now abandoned.

BACKGROUND OF THE INVENTION

The present invention relates to apparatus for feeding bulk materials and in particular to apparatus for metering one or more varieties of such material to an outlet station.

Metering apparatuses for bulk materials comprising a main conveyor associated with metering conveyors are known. These conveyors are generally screw conveyors. A single motor can simultaneously drive all the conveyors, but each metering conveyor has a variable speed operating system permitting an individual regulation of the flow.

Such arrangements are for example described in French Pat. No. 69/39742 of Nov. 19th, 1969 as printed under 2,067,849.

In apparatus of this type, it is difficult to combine several conveyors into select groups since it is far from easy to regulate the operating speed of the individual metering conveyors, particularly during operation. Certain operational safety devices would also be desirable particularly when there is no material or when the material in the conveyor jams up within the conveyor. The available torque is not sufficient to give the conveyors an adequate torque force and dimension to convey the necessary amounts of the material.

SUMMARY OF THE INVENTION

The object of the present invention is to obviate the above-indicated disadvantages.

According to the present invention, apparatus is provided for mixing several materials (such as foodstuff or the like) comprising a plurality of metering units connected to a common discharge conveyor. Each of the metering units is in the form of a housing having on its external side the drive means and a member for regulating the operating speed of a metering screw conveyor, and on its other side a metering screw conveyor communicating with a hopper or other storage device for any pulverulent, granular or pasty constituent (such as a food product). The screw conveyor may also be connected to other storage or sampling units by extensions or by the use of bevel gear conveyor mechanisms. The housing also has connecting and supporting means for a discharge screw conveyor for the metered product, particularly in conjunction with other constituents of the foodstuff to be prepared.

The connection between the drive member and the shaft of the metering screw conveyor is effected through a crank pin by means of an adjustable linkage connected to the crank of a free driving wheel cage or uni-directional clutch associated with a free hold-back wheel.

This adjustable linkage comprises a coupling rod connected to one of the ends of the drive crank pin, the other end being pivotably mounted on a connecting rod which is itself articulated to a crank pin of the free driving wheel cage, whilst the articulation between the coupling rod and the connecting rod is limited by a tie rod which is itself articulated to the end of a control crank whose angular position can be adjusted during operation.

It is thus possible to regulate with great accuracy the drive speed of the corresponding metering screw conveyor and therefore the flow of material conveyed. This value can be displayed by a stop marker whereon is applied a blocking and operating handle of the corresponding control crank. Obviously, a zero flow position can be obtained by aligning the connecting rod and tie rod in the same plane so that the articulation axes between free wheel crank pin and connecting rod on the one hand and between the tie rod and the free wheel crank on the other can be made to coincide.

Independently of these continuous regulation means the arrangement provided in each unit includes means for the coupling of the corresponding metering screw conveyor and the drive means so as to prevent lump formation. In this regard, the mechanism for preventing lump formation is connected with the metering screw conveyor by a shear bolt breakable upon the application of a predetermined torque. This prevents any jamming or clogging up of material in the discharge conveyor, by arresting the metering conveyor.

Located opposite to this frangible connection in the jacket of the metering screw conveyor is an oscillating flap associated with a microswitch, which indicates the presence or lack of material in the conveyor. The micro switch is connected to a circuit breaker in the supply circuit of the electric drive motor. The object of such an arrangement is to prevent any obstruction passing unnoticed, and to prevent the supply of an incorrectly metered product due to the lack of one constituent. As an alternative, this safety device can be eliminated by use of another microswitch operated automatically when the regulating handle of the metering device is placed in the zero flow position.

A conveyor serving as a discharge is similarly located extending laterally through the housing from unit to unit and is provided with an identical arrangement having an oscillating flap and microswitch whose object is the same to prevent jamming, etc. Moreover, a trap door is provided in each housing; controlled by an operating handle which frees the lower portion of the conveyors of products whilst preventing flow towards the discharge screw conveyor diverting it into a subjacent slide valve, thus permitting the measurement of this flow in a predetermined unit of time.

Such units can be juxtaposed in line so as to form a regulatable mixer assembly. It is possible to locate the overall motor system at one end of the series so that it drives by appropriate mechanical transmission the discharge screw conveyor on the one hand and on the other the drive means for the metering conveyors of each of the connected units, which can be connected serially by suitable counter-chain drives. The discharge screw conveyor can be connected to the intake of any desired storage or treatment system, including a magnetic sorting means is provided in the circuit.

Thus, members are available which can be integrated into a system which can be as extensive and complex as desired.

The following description relative to the attached drawings deals with non-limitative examples which serve to illustrate and provide a better understanding of the invention.

DESCRIPTION OF THE DRAWINGS

FIG. 1 shows in perspective a mixing system comprising five units, each having an individual supporting housing;

FIG. 2 shows in plan view and in partial manner the mechanism enclosed in the support of each unit, the support not being shown;

FIG. 3 shows in section one of the safety flaps;

Figure 4:
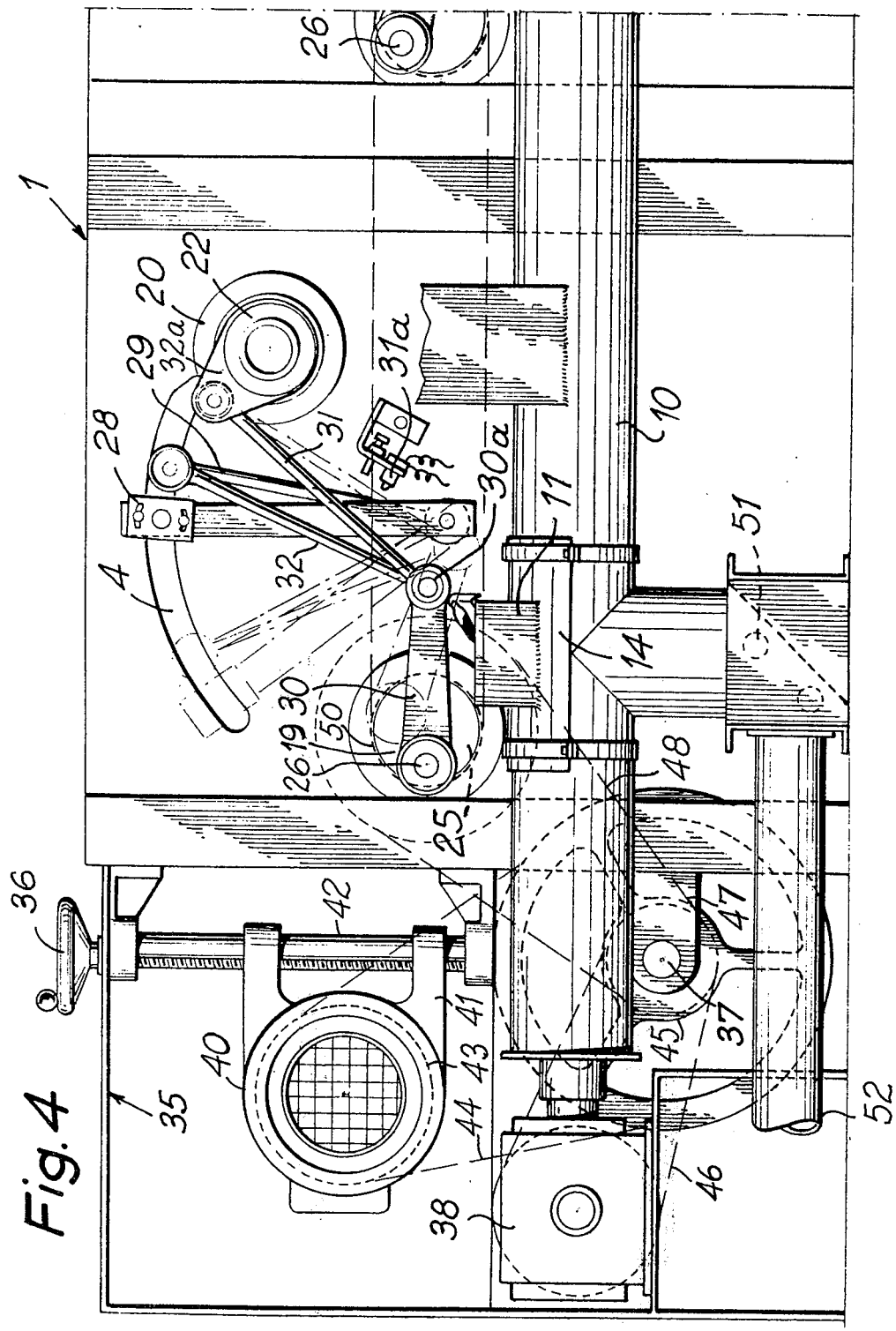
FIG. 4 shows a rear view of the mechanism of FIG. 2, whereby the corresponding support is adjacent to a juxtaposed drive system; and, FIG. 5 is an end view of the apparatus shown in FIG. 4 from the left side.
Figure 5:
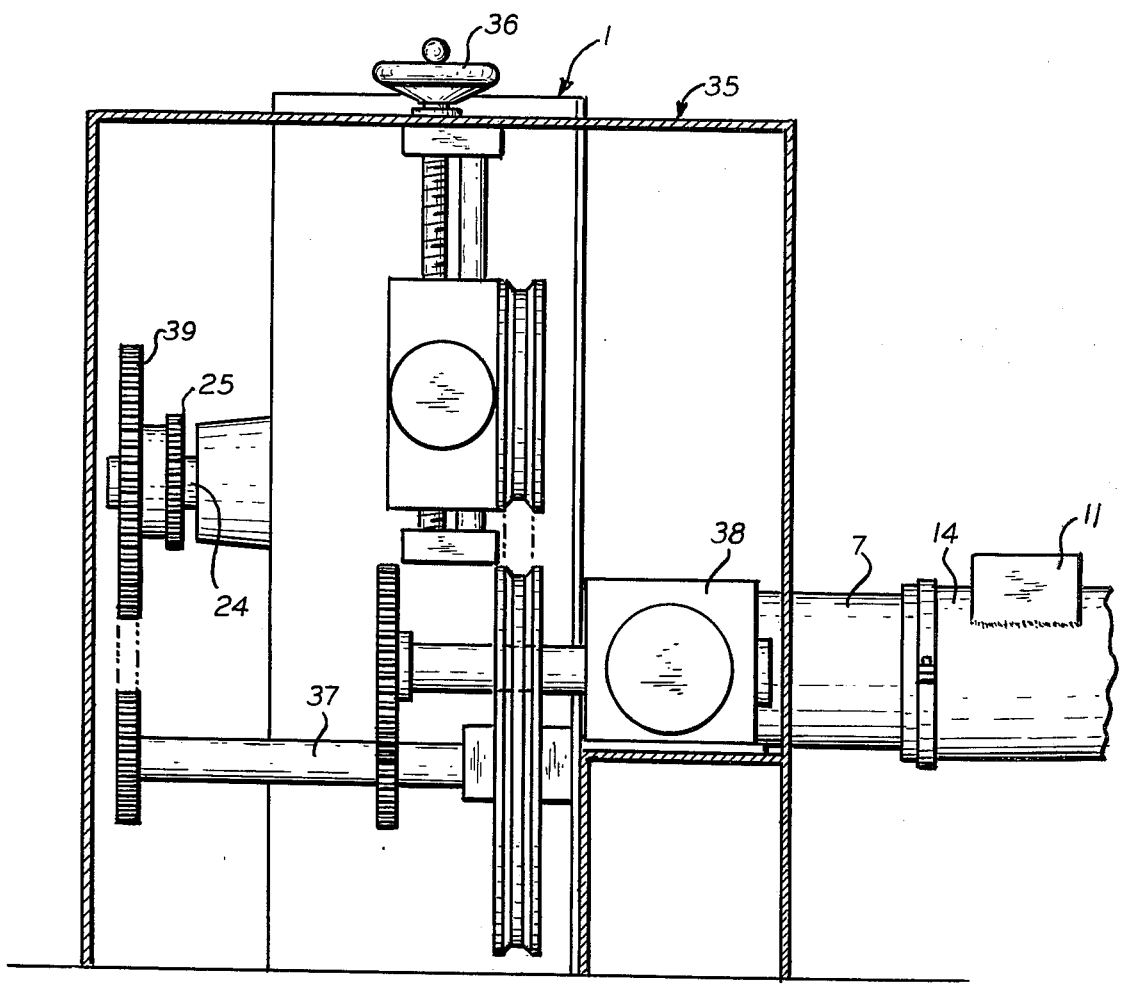

As can be seen in FIG. 1, an arrangement of a plural number of mixing units generally depicted by the numeral 1 is provided comprising a drive unit 35 along side of which is located a series of mixing units each comprising a housing 2 supported on the floor by means of mount 3. The front portion of the housing is provided with an arcuately shaped slot 4, from which projects a handle 5 carried at one end of a crank 31 located internally of the housing. In front of the rear wall there is provided a cover 6 which protects the transmission system to be described hereinafter. Projecting from the rear wall of each of the housings 2 is a tubular jacket 7 of a metering screw conveyor which extends to a discharge hopper 8 in which a pulverulent, granular or pasty material is stored. If desired, the screw conveyor can be elongated by an extension 8a or by an angled worm conveyor 8b forming auxiliary branches from individual hoppers or silos containing different sizes or mixtures of material.

As seen in FIG. 2, the jacket 7 terminates within the housing 2 in a connection 9 which couples the jacket 7 to a lateral discharge or a transfer screw conveyor 10 extending through the serially arranged housing 2. The jacket 7 is provided with an opening 11 in which a movable flap 12 is located. The flap 12 is raised by the material circulating in jacket 7 but freely drops towards the axis of the screw conveyor when the flow of material falls or descreases for some reason or other.

Associated with the flap 12 is a switch 13 electrically arranged in a control circuit. Additionally or alternatively, another microswitch 31a may be provided (FIG. 4) which is operated automatically when the regulating crank 31 of the metering device is placed in the zero flow position. A flap system identical to that found in jacket 7 is provided on a connection 14 arranged on covering of the lateral discharge conveyor 10.

Located within each jacket 7 is a screw conveyor having a central shaft 15 at the end of which is integrally formed a socket connection 16 in which is received the central shaft 17 of a separate screw conveyor/anti-lump forming device of generally conical shape. The central shaft 17 extends through the housing 2 and is connected for positive drive to the transmission located in the cover 6.

The shaft 15 and the shaft 17 are joined for conjoint rotation by a bolt 18 extending radially through the socket 16. The bolt 18 is designed to shear if a torque is exerted thereon which is above a predetermined limit.

A sensor 19 is mounted on the top of connection 9 and is operable, as part of the anti-clog device in case of an abnormal accumulation of products within the connection to provide a signal for a control circuit including an electrically operated speed counter, deriving its information from the shaft 17 of the screw conveyor - anti-lump formation, by means of a boss cam and push-button or any other appropriate means. The electrical control circuit may be located on a not shown panel or desk in conjunction with information counter for the above-mentioned flaps.

Located within housing 2 is a bearing 20 in which is journaled the axle 21 of a free-wheel driving member or uni-directional clutch. The axle 21 is fixed to the shaft 17 of the screw conveyor - anti-lump formation device and is surrounded by the cage 22 of the uni-directional clutch from which a radial arm extends having a crank pin 22a. Externally of the housing the axle 21 is also fixed to a second braking or hold-back wheel member having the same driving direction and whose cage 23 is bolted to the said wall.

The outer wall of the housing 2 also carried a bearing 25a for the drive shaft 24 which has, externally, a sprocket wheel 25 and internally an eccentric plate carrying a crank pin 26. The outer wall also carries a rotatable axle 27 provided with a marker 28 and a crank 29. The end of the crank 29 terminates in a connection with the handle 5 and the end of the marker 28 terminates in a coupling held by adjustable gudgeon lock nuts and the whole system is placed in slot 4.

The crank pin 26 carries a rod 30 which itself carries a spindle 30a on which is journalled a rod 31 connected at its other end to the crank pin 22a of the free-wheel drive cage 22. In the same way, a tie rod 32 is mounted to the spindle 30a connecting it to the end of crank 29 on the spindle of button 5.

Tie rod 32 is of the same length as connecting rod 31 in such a way that the axis of the handle 5 can be made to coincide with the axis of the crank pin 22a of the driving free wheel. In this position the movement given to spindle 30a by the oscillation of rod 30 has a zero result on the driving free wheel 22. Thus, this relates to the zero position when the shaft 15 of the screw conveyor within the jacket 7 is immobile. The other positions of the handle 5 in the slot 4, indicated on marker 28 each correspond to various driving speeds in the respective metering conveyor and therefore the corresponding rate of flow of the material.

Each housing 2 is provided with a corresponding, not shown, trapdoor is operated by a handle 33 to permit the diversion of the material flow transported either towards the screw conveyor or to the outside into a sampling slide draw 34 held by mounting 3.

At the head of the series of housings there is located into housing 35 a drive unit which comprises a motor 39, a speed variator 40 mounted on an adjustable supporting bracket 41. The bracket is mounted on a rack 42 having a manipulating wheel 36. The variator 40 includes a reduction gear system having an output pulley 43 connected by a belt or chain 44 to the shaft 37 which carries a driving sprocket over which a chain 46 is entrained leading to a bevel gear 38 which drives the lateral screw conveyor 10. Another driving sprocket is fixed on shaft 37 and a chain is entrained over it leading to a sprocket wheel 25 keyed on the shaft 24.

The shaft 24 can be connected via a sprocket wheel by a chain to the identical shafts of the succeeding housing underneath casing 6, so as to transmit the drive simultaneously to all units in the series.

It is thus possible to produce a system of any desired length with any random number of units using only one drive motor which permanently ensures constant metering of different products into a substance forming a mixture. The lateral screw conveyor 10 can supply any subsequent treatment apparatus such as a grinder or a' direct storage means, and this can be made to take place at any drive speed of the said screw conveyor. The quantities metered can be easily controlled, changed and monitored by control of the individual conveyors 7.

A magnetic sorting device 40 can be placed on the discharge circuit for the metered products.

It is obvious that without passing beyond the scope of the invention various modifications can be made to the embodiments described hereinbefore. Thus, in place of screw conveyors any appropriate technically equivalent conveyor can be used, particularly for the discharge or lateral screw conveyor which can be replaced, for example, by a pipe placed under vacuum by a pneumatic transportation apparatus.

An automatic oscillating flap limits the connection between this pipe under vacuum on the one hand and each metering screw conveyor on the other so that:

a) Suction of the metered products into the discharge screw conveyor is prevented.

b) The entry of too much outside air is prevented because this would otherwise lead to a great increase in the size of the pneumatic conveyor and to a limitation in the number of metering units.

What I claim is:

1. Apparatus for dispensing mixtures of more than one constituent of bulk material comprising a single elongate mixing and discharge conveyor, a plurality of metering conveyors each comprising a screw conveyor leading from a source of one of the constituents of each mixture and terminating at said mixing and discharge conveyor, a housing surrounding the terminus of each of said metering conveyors and the associated portion of said mixing and discharge conveyor, and means for simultaneously driving said mixing and discharge conveyor and each of said metering conveyors comprising a single motor located adjacent one of said housings and transmission means extending serially into each housing connecting said motor and an adjustable speed variator interposed between the terminus of each of said metering conveyors and said drive transmission means for driving the associated metering conveyor and for continuously and selectively varying, during operation of said mixing and discharge conveyor and the metering conveyors, the speed of said associated metering conveyors independently of the operation of the other metering conveyors, each of said housings supporting the transmission means and speed variator means associated with the respective metering conveyor and being arranged in abutment in line with each other, said discharge conveyor extending in line serially through each of said housings, said speed variator means comprising an adjustable linkage connected at one end to said transmission means and at the other end to a first uni-directional clutch member, said first uni-directional clutch member being secured between the shaft of said screw conveyor and a second uni-directional clutch member mounted on said housing, said adjustable linkage comprising a handle having a regulating crank arm pivotally mounted at one end extending through an arcuate slot in a wall of said housing opposite said screw conveyor, a crank pin movable by said transmission means, a coupling rod rotatably connected at one end to said crank pin, a spindle journalled at the other end of said coupling rod, and a tie rod adjoining said spindle and said regulating crank arm at the axis of said handle, and a connecting rod joining said spindle and said uni-directional clutch member.

2. The apparatus according to claim 1 wherein the length of said tie rod is equal to the length of said connecting rod.

3. The apparatus according to claim 1 including means for controlling the operation of the speed variators of each of said metering conveyors responsive to the presence of a normal amount of material conveyed therein.

4. The apparatus according to claim 1 including means for controlling the operation of the speed variators of each of said metering conveyors responsive to an abnormal accumulation of product at the outlet end of said conveyor.

5. The apparatus according to claim 1 including means for limiting the torque force between the drive means and the speed variator of each of said metering conveyors, and in response to an excess of force arresting said associated metering conveyor.

6. The apparatus according to claim 1 including means for controlling the discharge conveyor in response to the presence of material conveyed therein.

7. The apparatus according to claim 1 in which the transmission means comprises a drive shaft and a pair of sprocket wheels mounted thereon, one of said sprocket wheels driving the discharge conveyor, the other of said sprocket wheels driving the adjacent metering conveyor, each metering conveyor being provided with a shaft and sprocket transmission for serially connecting successively adjacent metering conveyors.

8. The apparatus according to claim 7, including a speed variator interposed between said motor and said drive shaft having a sprocket driving said discharge conveyor for varying the delivery of said discharge conveyor and proportionally each delivery of each of said metering conveyors.

9. The apparatus according to claim 8 including positive transmission interposed between the drive shaft and the metering conveyors.

10. The apparatus according to claim 1 including means for extending said metering conveyors in opposite direction to said discharge conveyor.

* * * * *